United States Patent [19]
Payne et al.

[11] 4,404,797
[45] Sep. 20, 1983

[54] GAS TURBINE ENGINE POWERPLANT

[75] Inventors: Charles E. G. Payne; Thomas I. Y. Jones; Peter A. Dootson, all of Bristol, England

[73] Assignee: Rolls Royce Limited, London, England

[21] Appl. No.: 323,366

[22] Filed: Nov. 20, 1981

[30] Foreign Application Priority Data

Dec. 10, 1980 [GB] United Kingdom ............... 8039520

[51] Int. Cl.³ ........................... F02C 7/22; F02C 7/32
[52] U.S. Cl. ............................... 60/39.281; 60/39.33; 290/43; 290/54
[58] Field of Search ............... 60/39.281, 39.07, 39.33, 60/396; 290/43, 54

[56] References Cited

U.S. PATENT DOCUMENTS

| | | | |
|---|---|---|---|
| 2,432,358 | 12/1947 | Warner | 60/39.33 |
| 2,963,866 | 12/1960 | Bookout et al. | 60/396 |
| 3,145,532 | 8/1964 | Moss | 60/39.07 |

Primary Examiner—Louis J. Casaregola
Attorney, Agent, or Firm—Parkhurst & Oliff

[57] ABSTRACT

Gas turbine engine powerplant has an engine 10 including a fuel pump 14 driven by the engine to supply fuel to the combustor 12 thereof. The pump flow rate varies in accordance with the requirements of the engine as determined by an electric control system 17. Power supply for the control system is derived from an alternator 29 driven by a hydraulic motor 28 fed by pump delivery. A constant flow device 22 arranged between the pump and the motor ensures constant speed for the alternator and thus a constant voltage for the control system.

3 Claims, 1 Drawing Figure

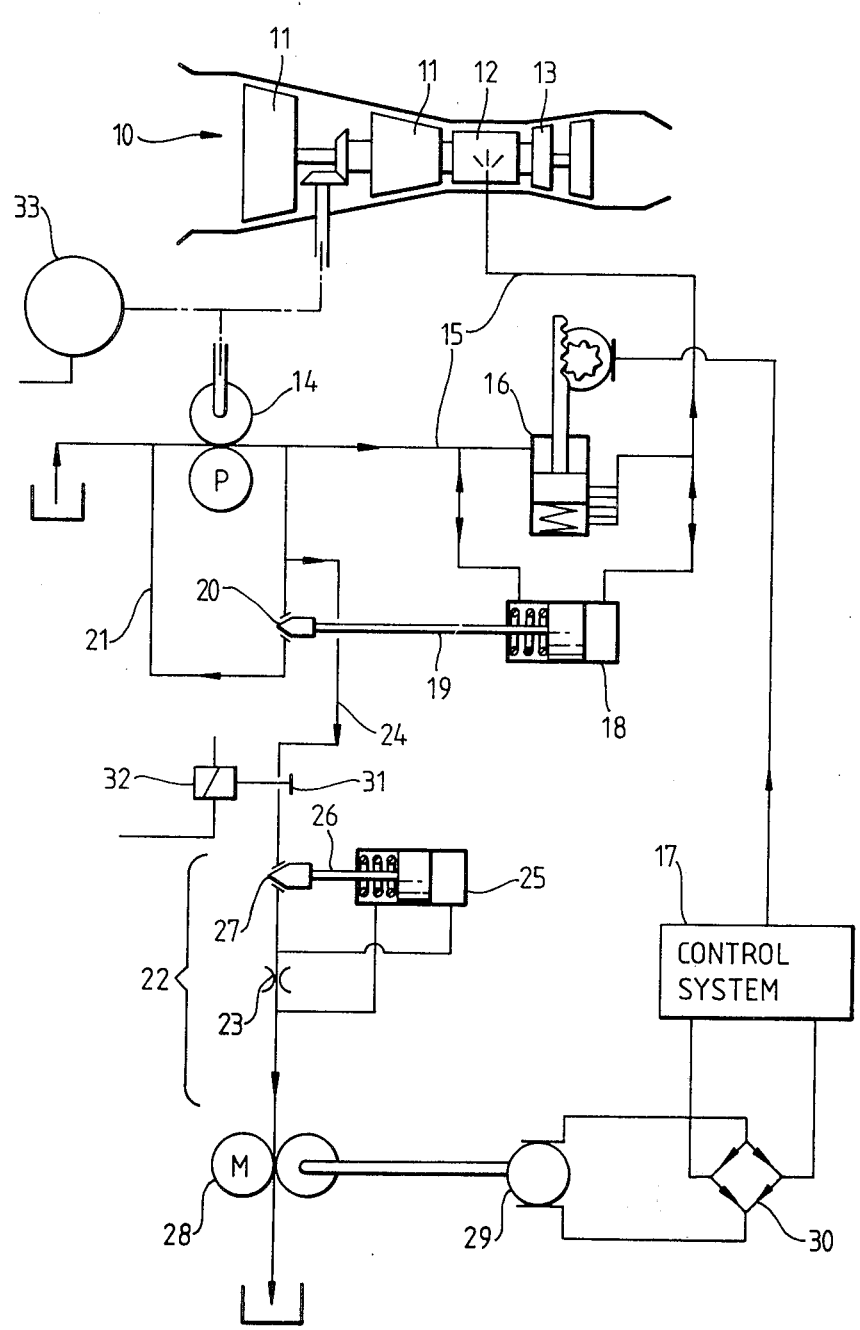

GAS TURBINE ENGINE POWERPLANT

DESCRIPTION

This invention relates to a gas turbine engine powerplant.

It is known in such powerplant to provide a common electric power supply both for general purposes, e.g. the air-conditioning of an aircraft cabin, and for the particular purpose of supplying the substantially smaller power required for an electronic control system for the fuel supply to the engine. The known power supply comprises an electric alternator driven by the engine through the intermediary of a speed regulator, e.g. an infinitely variable hydraulic pump and motor unit, controlled by a governor to maintain the speed of the alternator constant with a view to maintaining a constant voltage output. It is sometimes desirable to supply the power for the electronic control system independently of the general purpose power supply. In view of the relatively small size of a generator for the engine control system it would be uneconomical, bulky and weighty to provide a said speed regulator. It is an object of this invention to reduce or overcome this difficulty.

According to this invention there is provided a gas turbine engine powerplant comprising a gas turbine engine, a fuel pump connected to be driven by the engine and having a delivery duct connected to feed fuel to the engine, an electronic control system for varying the flow rate of fuel in the delivery duct thereby to vary the speed of the engine, a branch duct connected to the delivery duct and subject to pressure changes produced therein by said varying flow rate, changing means provided in the branch duct for changing the variable flow rate produced by said pressure changes into a constant flow rate, a hydraulic motor connected to be driven by said constant flow rate, an electric generator connected to be driven by the motor and connected to provide power for said control system.

An example of a power plant according to this invention will now be described with reference to the accompanying drawing which is a diagrammatic illustration of the power plant.

Referring to the drawing there is shown a gas turbine engine 10 having, in flow-series, a compressor 11, a combustor 12, and a turbine 13 connected to drive the compressor. The compressor 11 is connected to drive a positive displacement pump being a gear pump 14 which delivers fuel through a delivery duct 15 to the combustor 12. The duct 15 contains a throttle valve 16 operated by an electronic fuel flow control system 17. A pressure sensor 18 is connected across the valve 16 and has an output element 19 connected to vary a throttle valve 20 connected across the pump 14 by means of a spill line 21. The sensor and valve 18,20 co-operate to vary the flow rate of the pump to keep the pressure drop across the valve constant. Thus the flow rate of fuel in the duct 15 is varied in response to the setting of the valve 16 by the control system 17, this resulting in a corresponding variation of pressure in the duct 15.

The spill line 21, which is subject to the varying pressure in the duct 15 is connected at the high pressure side of the valve 20 to a branch duct 24 containing a constant flow device 22. The latter has a restrictor 23 in the duct 24, a pressure sensor 25 connected across the restrictor 23 and having an element 26 connected to vary a throttle valve 27 provided in the duct 24 upstream of the restrictor. The sensor 25 and valve 27 co-operate to keep the pressure drop across the restrictor 23 constant thereby to keep the flow rate through the duct 24 constant against the pressure changes upstream of the valve 27. Downstream of the device 22 the duct 24 is connected to drive an alternator 29. The output of the alternator is taken through a rectifier 30 to become the power supply for the control system 17. The constant flow rate to the motor 28 ensures a correspondingly constant voltage output of the alternator and rectifier to the control system.

The engine is also connected to drive a main alternator 33 which supplies power for general purposes, and which may be connected to provide power for the system 17 also. In that case the duct 24 includes a normally open valve 31 which is held closed by a solenoid 32 energised by said main alternator. If the latter fails, the valve 31 opens and the alternator 29 supplies power to the system 17.

We claim:

1. Gas turbine engine powerplant comprising a gas turbine engine, a fuel pump connected to be driven by the engine and having a delivery duct connected to feed fuel to the engine, an electronic control system for varying the flow rate of fuel in the delivery duct thereby to vary the speed of the engine, a branch duct connected to the delivery duct and subject to pressure changes produced therein by said varying flow rate, changing means provided in the branch duct for changing the variable flow rate produced by said pressure changes into a constant flow rate, a hydraulic motor connected to be driven by said constant flow rate, an electric generator connected to be driven by the motor and connected to provide power for said control system.

2. Powerplant according to claim 1 wherein the pump is a positive displacement pump, the control system is connected to operate a throttle valve provided in the delivery duct downstream of the pump, and means are provided for varying the flow rate of the pump responsive to the setting of the throttle valve by the control system.

3. Powerplant according to claim 1 or claim 2 wherein said changing means comprise a restrictor provided in said branch duct, sensor means for sensing a flow parameter through the branch duct, and a throttle valve provided in the branch duct upstream of the sensor means and connected to the sensor means to vary the flow rate through the branch duct in the sense of keeping said parameter constant.

* * * * *